Patented Nov. 5, 1935

2,019,591

UNITED STATES PATENT OFFICE 2,019,591

SYNTHETIC RESIN PRODUCT AND PROCESS

Walter Wollaston, North Muskegon, Mich., assignor to The Brunswick-Balke-Collender Company, Chicago, Ill., a corporation of Delaware No Drawing. Application March 24, 1932,
Serial No. 601,054

10 Claims. (Cl. 18—55)

This invention relates to an improved synthetic resin product and process of making same, and has for one of its principal objects the provision of a new condensation product which shall employ a urea formaldehyde resin modified by the addition of a phenol formaldehyde resin and a phthalic anhydride glycerin resin in its formation.

One of the objects of this invention is to provide a synthetic resin which shall be relatively inexpensive and easy of manufacture, and which can be molded by heat and pressure into blocks or slabs capable of being worked into various shapes.

Another object of the invention is to provide an improved synthetic resin capable of being molded by heat and pressure into relatively massive blocks which can then be worked into various shapes, and which will be free from a tendency to discolor due to exposure to sunlight or the elements. Blocks of this composition, furthermore, will not be subject to cracking or checking whether retained in their original molded form or after machining.

Another and further important object of the invention resides in the provision of a condensation product of an aliphatic aldehyde preferably of formic aldehyde with carbamid or carbamid derivatives and further mixture of these products with synthetic resins or resin-forming substances, with or without fillers or coloring agents.

Other and further important objects of the invention and the process will be apparent from the disclosures in the following specification.

The improved resin of this invention may have the following general composition:

| | |
|---|---|
| Phenol formaldehyde resin | 5 to 20% |
| Glycerin, phthalic anhydride glycerin resin, or a plasticizer | 1 to 10% |
| Urea formaldehyde resin | 40 to 70% |
| Filler for necessary body and color | to complete |

The urea formaldehyde resin can be prepared by boiling urea and formaldehyde in the presence of an acid catalyst such as phthalic anhydride, until the major portion of the water is removed, and the product is still fusible.

The phenol formaldehyde resin is prepared in the usual manner, using an acid catalyst, but the reaction is not continued until the product attains an infusible form.

The phthalic anhydride glycerin resin is prepared from phthalic anhydride and glycerin by heating phthalic anhydride with glycerin until inherent color develops, while still remaining fusible.

The urea formaldehyde resin, the phenol formaldehyde resin and the phthalic anhydride glycerin resin or other plasticizer are then combined and mixed in desired proportions with desired proportions of a filler such as lithopone, zinc oxide, titanium oxide, barytes, or the like, together with any desired coloring. Mixing with heating is then continued until the composition sets up to a stiff consistency.

The material is then allowed to cool, after which it is ground and dried at approximately 110° C. until it just retains sufficient thermal plasticity to enable molding under heat and pressure into dense solid masses. This material is then milled to a fine powder and pressed in a positive type mold, under approximately 3,000 pounds per square inch pressure at approximately 150° C., until the product is substantially infusible. This procedure results in a hard, practically infusible substance which can be worked, cut, or shaped into various objects, such as billiard balls, umbrella handles, dishes, portions of tools, insulating elements, toys, or the like, which will not change materially in color upon exposure to light, and which will not develop checks or cracks either before or after machining.

The proportions and nature of the ingredients used and also the method involved in the manufacture can be varied considerably to meet certain requirements as found necessary or desirable. For example, glycerin alone may be used as a plasticizer; and other plasticizers may be employed, such as dibutyl phthalate or any organic plasticizer, but in any event not condensed to an infusible condition.

I am aware that many changes may be made in the ingredients and proportions and numerous details of the process varied throughout a wide range without departing from the principles of this invention, and I therefore do not purpose limiting the patent granted hereon otherwise than as necessitated by the prior art.

I claim as my invention—

1. A pressed urea formaldehyde phenol formaldehyde phthalic anhydride glycerin product.

2. A pressed urea formaldehyde phenol formaldehyde phthalic anhydride glycerin resin characterized by the presence of inherent color.

3. A hard, infusible reaction product of a urea formaldehyde resin modified by the addition of a phenol formaldehyde resin and phthalic anhydride glycerin resin.

4. A hard, infusible reaction product of a urea formaldehyde resin, made in the presence of an acid catalyst and modified by the addition of a phenol formaldehyde resin and a plasticizer such as phthalic anhydride glycerin resin.

5. A hard, infusible reaction product of a urea formaldehyde resin, made in the presence of an acid catalyst and modified by the addition of a phenol formaldehyde resin and a plasticizer such as phthalic-anhydride-glycerin resin, together with a filler.

6. A process of preparing a condensation product by preliminarily preparing a urea formaldehyde resin in the presence of phthalic anhydride and combining it with a phthalic anhydride glycerin resin and a phenol formaldehyde resin.

7. A process of preparing a condensation product by preliminarily preparing a urea formaldehyde resin in the presence of phthalic anhydride and combining it while in a fusible state with a phthalic anhydride glycerin resin and a phenol formaldehyde resin.

8. A process of preparing a condensation product by combining a urea formaldehyde resin with a phenol formaldehyde resin and a phthalic anhydride glycerin resin, all in a fusible state, and heating and mixing the same with a filler until the composition attains a stiff consistency.

9. A process of preparing a condensation product by combining a urea formaldehyde resin with a phthalic anhydride glycerin resin and a phenol formaldehyde resin with a filler and mixing and heating until the composition attains a stiff consistency, then cooling, grinding and drying at 110° C. until the composition has just sufficient thermal plasticity to mold under heat and pressure.

10. A process of preparing a condensation product by combining a urea formaldehyde resin with a phthalic anhydride glycerin resin and a phenol formaldehyde resin with a filler and mixing and heating until the composition attains a stiff consistency, then molding under heat and pressure, and finally shaping and finishing.

WALTER WOLLASTON.